(12) United States Patent
Gharpure et al.

(10) Patent No.: US 10,400,650 B2
(45) Date of Patent: Sep. 3, 2019

(54) INJECTOR DEPOSIT DISSOLUTION SYSTEM AND METHOD

(71) Applicant: Perkins Engines Company Limited, Peterborough (GB)

(72) Inventors: Siddharth Subhash Gharpure, Peterborough (GB); Tom Carlill, Stamford (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 15/829,191

(22) Filed: Dec. 1, 2017

(65) Prior Publication Data

US 2018/0163595 A1 Jun. 14, 2018

(30) Foreign Application Priority Data

Dec. 12, 2016 (EP) ..................... 16203403

(51) Int. Cl.
*F01N 3/24* (2006.01)
*F01N 3/20* (2006.01)

(52) U.S. Cl.
CPC ............. *F01N 3/24* (2013.01); *F01N 3/2066* (2013.01); *F01N 2470/00* (2013.01); *F01N 2610/02* (2013.01); *F01N 2610/14* (2013.01); *F01N 2610/1493* (2013.01); *Y02T 10/24* (2013.01)

(58) Field of Classification Search
CPC ............. F01N 2470/00; F01N 2610/14; F01N 2610/1473; F01N 2610/1486; F01N 2610/1493
See application file for complete search history.

(56) References Cited

U.S. PATENT DOCUMENTS

| 6,852,292 | B2 | 2/2005 | Berriman et al. |
| 8,360,087 | B2 | 1/2013 | Kolberg et al. |
| 9,453,448 | B2 | 9/2016 | Levin et al. |
| 9,494,069 | B2 | 11/2016 | Haeberer et al. |
| 2009/0277162 | A1 | 11/2009 | Cominetti et al. |
| 2011/0094206 | A1 | 4/2011 | Liu et al. |
| 2013/0192207 | A1* | 8/2013 | Chiba ..................... F01N 3/208 60/274 |
| 2014/0196808 | A1* | 7/2014 | Besnard ................ F01N 3/2066 138/32 |
| 2015/0192046 | A1 | 7/2015 | Gharpure |
| 2016/0131005 | A1 | 5/2016 | Bruck et al. |

FOREIGN PATENT DOCUMENTS

| EP | 2105592 A1 | 9/2009 |
| EP | 2631443 A1 | 8/2013 |
| GB | 2537598 A | 10/2016 |
| WO | 2006/074833 A1 | 7/2006 |
| WO | 2015/153350 A1 | 10/2015 |

* cited by examiner

Primary Examiner — Jonathan R Matthias

(57) ABSTRACT

An SCR injection system for an internal combustion engine is disclosed. Under certain conditions, reductant fluid supplied by the system may form deposits in a reductant injector. In order to dissolve the deposits, a reductant supply line includes at least a portion with a downward slope that is disposed above a reductant inlet of the reductant injector. This allows reductant fluid in the sloped portion to flow to the reductant inlet due to gravity. Advantageously, a bent portion is provided between the reductant inlet and the sloped portion in order to trap reductant fluid that may flow back towards the reductant injector when the system is purged.

15 Claims, 5 Drawing Sheets

INJECTOR DEPOSIT DISSOLUTION SYSTEM AND METHOD

CLAIM FOR PRIORITY

This application claims benefit of priority of European Patent Application No. 16203403.7, filed Dec. 12, 2016, which is incorporated herein by reference.

TECHNICAL FIELD

The present disclosure generally relates to an SCR injection system, and in particular to a system and method for dissolving deposits of crystallized reductant in an injector of such an SCR injection system.

BACKGROUND

Engine systems for vehicles and the like may comprise an aftertreatment module for removing unwanted gaseous emissions or pollutants from the exhaust gases of an internal combustion engine. In particular, a selective catalytic reduction (SCR) system may be provided in the exhaust gas stream for removing nitrogen oxides (NOx). Typically, an SCR system comprises a reductant injector reaching into a mixing pipe located upstream of a catalyst. The reductant injector may inject a liquid reductant into the exhaust gases before they contact the catalyst. Suitable liquid reductants may include anhydrous ammonia, aqueous ammonia and urea. The high temperature of the exhaust gases may evaporate the liquid reductant, and upon contact with the catalyst, the gaseous reductant may react with the NOx in the exhaust gas to form nitrogen and water.

However, if the exhaust gas temperature is too low, such as during low engine load conditions and in low duty cycles, the reductant may be deposited as solid compounds on components of the SCR system. In particular, the reductant may be deposited on or around an outlet nozzle of the reductant injector when eddy currents in the exhaust gas flow redirect injected reductant back onto the outlet nozzle. In addition, the reductant may crystallize and form deposits inside the reductant injector.

For example, WO 2015/153350 A1 discloses an anti-clogging device for a diesel exhaust fluid (DEF) supply, wherein a reservoir for air trapped in a feed line for supplying DEF to a dosing module is placed vertically above the dosing module.

The present disclosure is directed, at least in part, to improving or overcoming one or more aspects of prior systems.

SUMMARY OF THE DISCLOSURE

In one aspect, the present disclosure relates to an SCR injection system for an internal combustion engine. The SCR injection system comprises a reductant injector having a housing, a reductant inlet formed in the housing, and a reductant supply line. The reductant supply line is fluidly connected to the reductant inlet and configured to supply reductant to the reductant injector. The reductant supply line includes a downwardly inclined portion extending towards the reductant injector. The downwardly inclined portion is disposed at least in part above the reductant inlet of the reductant injector with respect to a horizontal datum line passing through the reductant inlet.

In another aspect, the present disclosure relates to an engine system comprising an internal combustion engine and an SCR injection system. The SCR injection system comprises a reductant injector having a housing, a reductant inlet formed in the housing, and a reductant supply line. The reductant supply line is fluidly connected to the reductant inlet and configured to supply reductant to the reductant injector. The reductant supply line includes a downwardly inclined portion extending towards the reductant injector. The downwardly inclined portion is disposed at least in part above the reductant inlet of the reductant injector with respect to a horizontal datum line passing through the reductant inlet.

In yet another aspect, the present disclosure relates to an SCR injection system for an internal combustion engine. The SCR injection system comprises a reductant injector having a housing, a reductant inlet formed in the housing and a reductant supply line fluidly connected to the reductant inlet for supplying reductant to the reductant injector. The SCR injection system further comprises an air release valve arranged in the reductant supply line or the reductant injector and configured to be actuated to allow air in the reductant supply line to escape from the system. A control unit may be configured to open the air release valve at a predetermined timing associated with a priming operation of the SCR injection system, or based on a detection by at least one sensor, for example, a fluid sensor and/or a pressure sensor disposed in the SCR injection system. The control unit may further be configured to close the air release valve after lapse of a predetermined time interval from initiating the priming operation, or based on a detection by at least one sensor, for example, a fluid sensor and/or a pressure sensor disposed in the SCR injection system.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
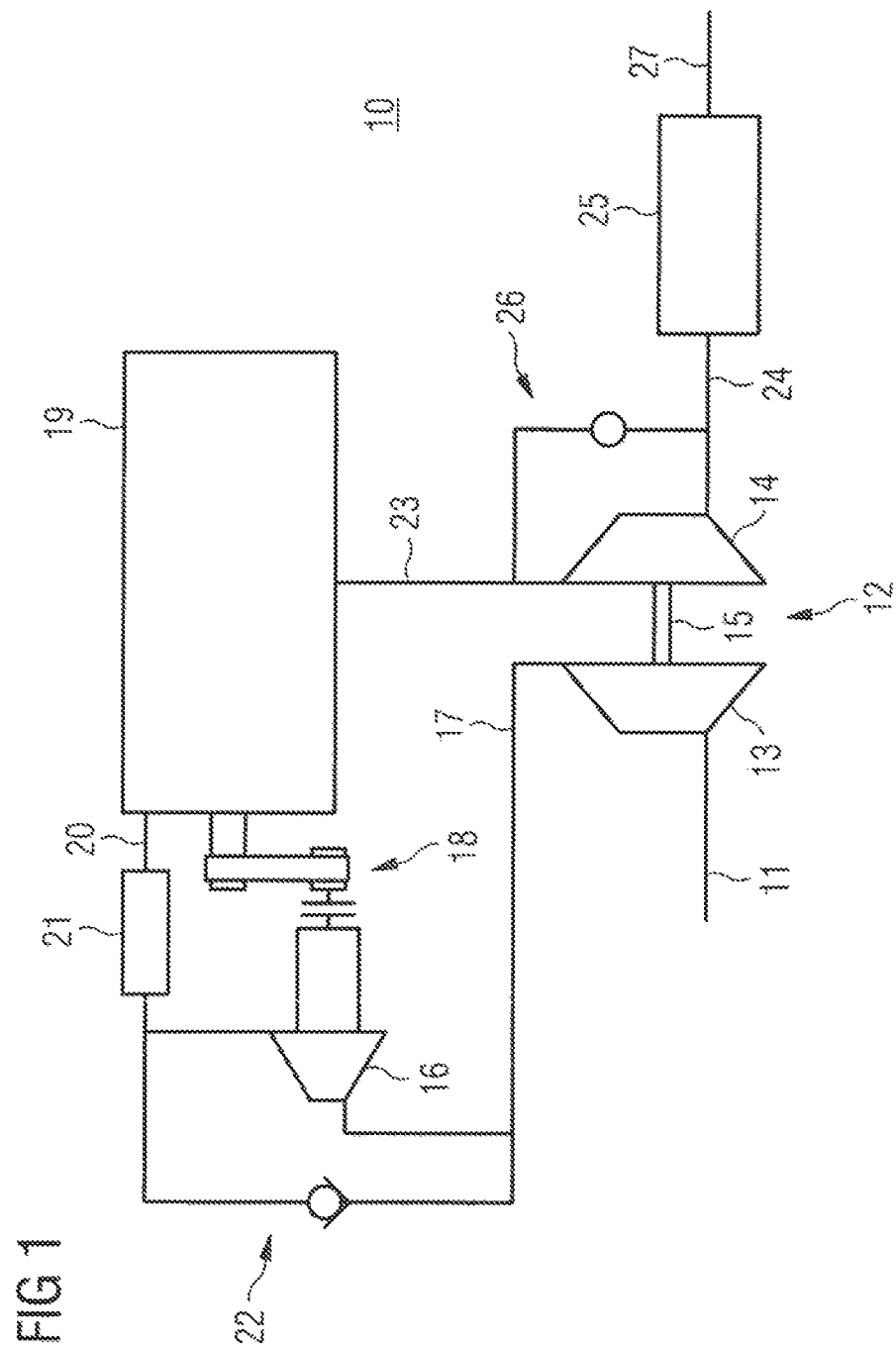
FIG. 1 is a schematic view of an exemplary engine system.

The following is a detailed description of exemplary embodiments of the present disclosure. The exemplary embodiments described herein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based in part on the realization that deposits in a reductant injector, in particular, crystallized reductant, may cause the reductant injector to stick, which may result in a failure of the associated SCR injection system. It has been realized that one possibility to dissolve the crystals formed in the reductant injector is to supply reductant fluid to the injector in order to dissolve the crystals. However, this is generally difficult, because, when the SCR injection system is primed, i.e., a pump begins supplying pressurized fluid to a reductant supply line, the air in the reductant supply line is compressed and pushed towards the injector. As a result, a pocket of pressurized air is formed in the stuck injector and the part of the reductant supply line adjacent to the injector, which stops the reductant fluid from entering the reductant injector.

The present disclosure is based in part on the realization that one possibility to avoid the above-mentioned problem is to use a specific routing of the reductant supply line. In particular, it has been realized that the above problem can be suppressed when the reductant supply line is arranged with a downward slope towards the injector. In this manner, when the system is pressurized, the reductant will flow to the injector due to gravity despite the air pocket being formed, allowing the dissolution of the crystals formed within the reductant injector.

The present disclosure is further based on the realization that, when the reductant supply line is routed such that it immediately extends upwards from the reductant injector, there is a possibility that some reductant can flow back into the injector during a purge operation, which can result in potential freeze damage to the injector. However, it has been realized that this issue can be dealt with by providing a bent portion arranged at least in part below the inlet of the reductant injector in the reductant supply line. In particular, the reductant supply line may extend downwards from the reductant injector towards the bent portion, and may then extend upwards from the bent portion to thereby trap reductant that might otherwise enter the injector in the bent portion.

The present disclosure is further based on the realization that a provision of an air release valve may also inhibit the problem of getting reductant to the injector when the system is primed. In particular, it has been realized that the provision of such an air release valve in a reductant supply line having the above-described configuration with a downward slope of the reductant supply line may allow reducing the length of the sloped portion of the reductant supply line, as the pocket of compressed air will be much smaller when the air is released by the air release valve prior to the reductant reaching the same. In some configurations, the portion having the downward slope may be omitted, in particular, when the air release valve is arranged on the reductant injector or immediately adjacent to the inlet of the same.

The present disclosure is also based on the realization that, when the configuration having the above-mentioned bent portion is used, it is advantageous when the distance in the vertical direction between the lowermost part of the bent portion and the inlet of the reductant injector is less than the diameter of the reductant supply line at the bent portion in order to allow air downstream of the bent portion to escape and the reductant fluid to reach the injector.

Finally, the present disclosure is based on the realization that, in other configurations, a reductant reservoir disposed above the inlet of the reductant injector in the vertical direction and fluidly connected to the same by a supply valve can also be used to supply reductant fluid to the injector in order to dissolve the deposited crystals, in particular, prior to priming the system.

FIG. 1 illustrates an exemplary embodiment of an engine system 10 suitable for implementing the teachings of the present disclosure. The engine system 10 comprises an engine 19 and an aftertreatment module 25. Additionally, as shown in FIG. 1, the engine system 10 may comprise a turbocharger 12, a supercharger 16, and a cooler 21.

Particularly, the engine system 10 comprises a first conduit 11 for directing intake gas, such as atmospheric air, to the turbocharger 12. The turbocharger 12 comprises a turbocharger compressor 13. The turbocharger compressor 13 is connected to the first conduit 11 and arranged to be driven by a turbine 14 via a shaft 15. The engine system 10 further comprises the supercharger 16 for receiving intake gas from the turbocharger compressor 13 via a second conduit 17. A supercharger drive arrangement 18 may be provided for selectively driving the supercharger 16. The engine 19 is arranged to provide power to the supercharger 16 mechanically via the supercharger drive arrangement 18.

In the embodiment, the engine system 10 further comprises a third conduit 20 for directing the intake gas from the supercharger 16 to the cooler 21. The engine system 10 further comprises a supercharger bypass arrangement 22 for selectively allowing intake gas to bypass the supercharger 16.

The engine 19 may be an internal combustion engine, such as a compression-ignition or spark-ignition engine. Fuel, such as diesel, gasoline or natural gas, may be selectively provided to engine cylinders in the engine 19 to combust with the intake gas and drive the pistons, thereby rotating a crankshaft and providing an engine output torque and power. The byproduct of the combustion process is exhaust gas, which is directed from the engine cylinders along a fifth conduit 23 of the engine system 10 via, for example, an exhaust manifold. The exhaust gas may comprise unwanted gaseous emissions or pollutants, such as nitrogen oxides (NOx), particulate matter (such as soot), sulphur oxides, carbon monoxide, unburnt hydrocarbons and/or other organic compounds. The fifth conduit 23 directs exhaust gas from the engine 19 to the turbine 14 of the turbocharger 12. The engine system 10 further comprises a sixth conduit 24 for directing exhaust gas from the turbine 14 to the exhaust aftertreatment module 25. A turbine bypass arrangement 26 may be provided for selectively allowing exhaust gas to bypass the turbine 14.

The exhaust aftertreatment module 25 receives and treats the exhaust gas to remove pollutants prior to directing the exhaust gas to the atmosphere via a seventh conduit 27.

Figure 2:
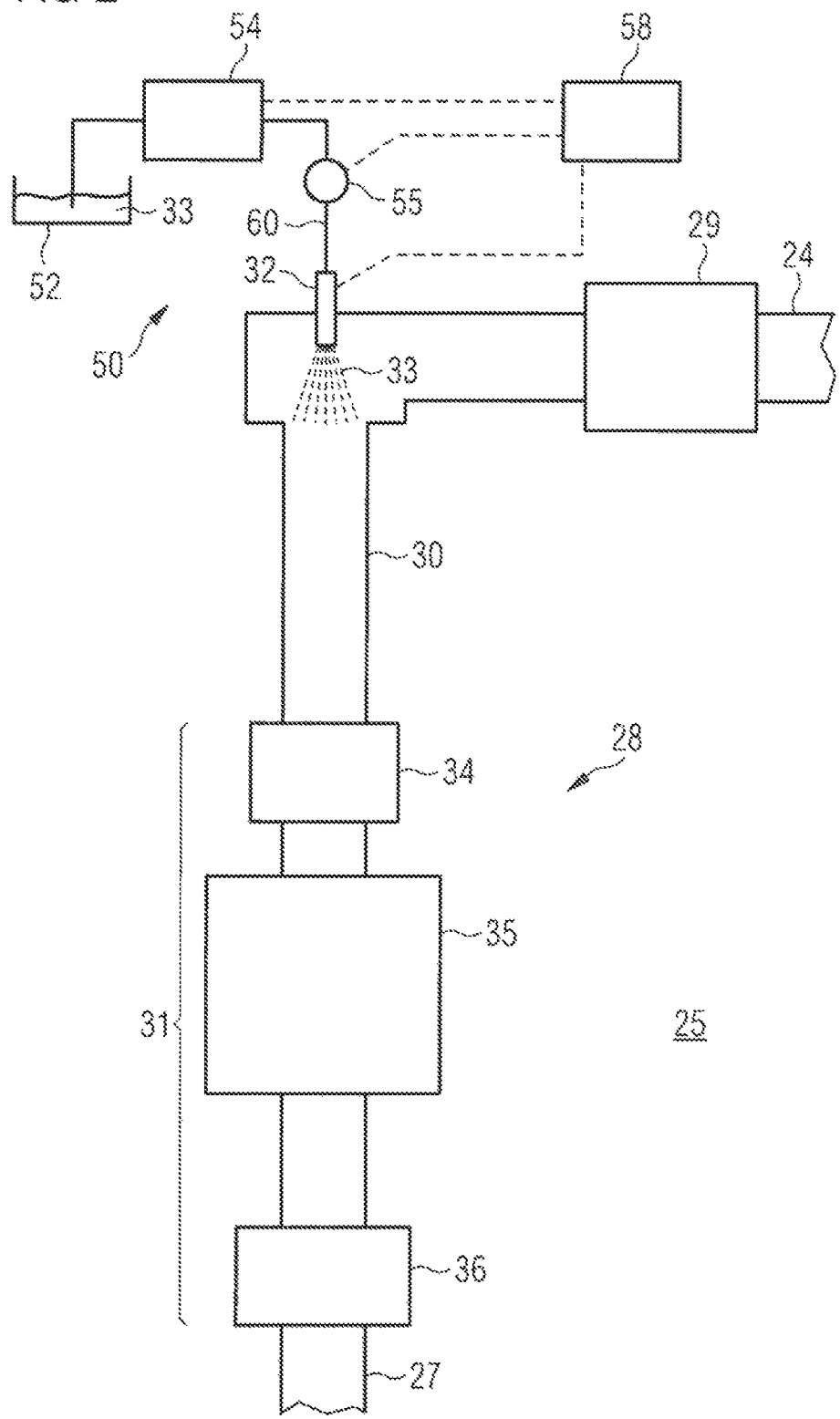
FIG. 2 is a schematic view of an exhaust aftertreatment module in accordance with the present disclosure.

As illustrated in further detail in FIG. 2, the exhaust aftertreatment module 25 comprises a selective catalytic reduction (SCR) system 28 and a diesel oxidation catalyst (DOC) 29. The DOC 29 may be arranged to receive exhaust gases from the sixth conduit 24 and may be located upstream of the SCR system 28. The SCR system 28 comprises an SCR conduit 30 leading from the DOC 29 to an SCR catalyst arrangement 31. The SCR system 28 further comprises an SCR injection system 50.

The SCR injection system 50 comprises a reductant injector 32, a reductant tank 52, and a pump 54. The reductant injector 32 projects into the SCR conduit 30 for selectively injecting reductant fluid 33 into the SCR conduit 30 upstream of the SCR catalyst arrangement 31. The reductant tank 52 is configured to store the reductant fluid 33, which may comprise aqueous urea, aqueous ammonia or the like. In particular, the reductant fluid 33 may be diesel exhaust fluid (DEF), and the DEF may meet the ISO22241 standard and comprise from 31.8% to 33.2% urea by weight. The pump 54 is configured to pump the reductant fluid 33 from the reductant tank 52 to the reductant injector 32 via a reductant supply line 60. For example, the pump 54 may be a diaphragm pump. Additionally, a pressure sensor 55 may be arranged and configured to measure a fluid pressure of the reductant fluid 33 in and/or downstream of the pump 54. In the embodiment, the pressure sensor 55 is connected to the reductant supply line 60 between the pump 54 and the reductant injector 32. Alternatively, for example, the pressure sensor 55 may be integrated into the pump 54 and/or the reductant injector 32

Furthermore, a control unit 58 is operatively connected to the pump 54, the pressure sensor 55 and the reductant injector 32. The control unit 58 is configured to receive pressure data from the pressure sensor 55, to control the pump 54, and to control (actuate) the reductant injector 32.

In the embodiment, the SCR catalyst arrangement 31 comprises, in the direction of exhaust gas flow, a mixer 34, a catalyst substrate 35 and a further oxidation catalyst or AMOx 36. The reductant injector 32 may selectively inject the reductant fluid 33, preferably as a liquid, into the stream of exhaust gas to provide a dose of reductant fluid 33 to the SCR catalyst arrangement 31. The high exhaust gas temperature may cause the reductant fluid 33 to evaporate, and the resulting combination of gases may reach the catalyst substrate 35. The reductant fluid 33 may react with the NOx in the exhaust gas to reduce it to nitrogen and water, which may exit engine system 10 via the seventh conduit 27. The catalyst substrate 35 may comprise zeolites, vanadium or the like.

The engine system 10 may further comprise at least one sensor arranged to sense one or more parameters relating to one or more of the components of the engine system 10 and send signals relating thereto to the control unit 58. In particular, the engine system 10 may comprise a temperature sensor in communication with the control unit 58 for determining the exhaust gas temperature at the outlet of the engine 19 and/or in the exhaust aftertreatment module 25. In some embodiments, the control unit 58 may also be in communication with one or more actuators for controlling the operation of the engine 19. In particular, the control unit 58 may be operable to control the turbocharger 12, the supercharger 16, the rate of fuel injection to the engine 19 and the injection of the reductant fluid 33 by the reductant injector 32. The control unit 58 may be a computer and may be operable to store and implement one or more computer programs and may comprise at least one memory, at least one processing unit and at least one communication means. The control unit 58 may be an engine control unit (ECU).

Figure 3:
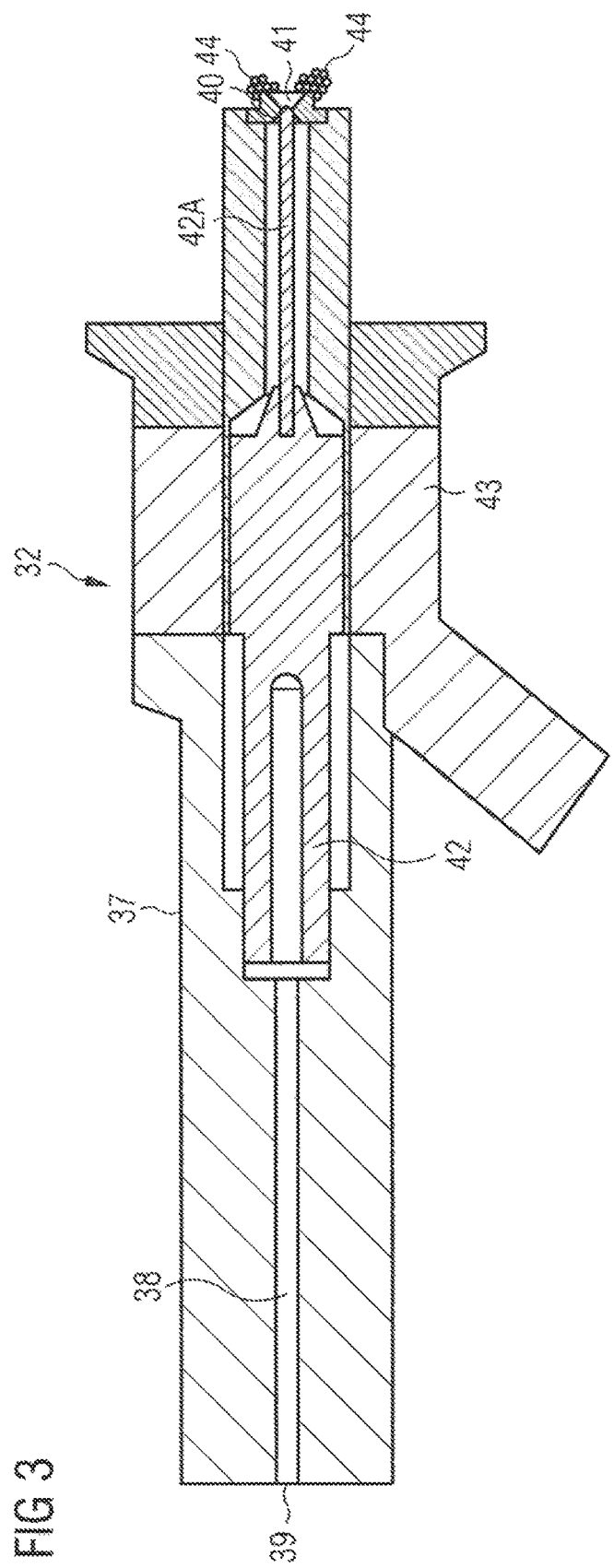
FIG. 3 is a schematic cross-section view of an exemplary reductant injector.

An exemplary reductant injector 32 suitable for the engine system 10 is illustrated in FIG. 3. The reductant injector 32 comprises a housing 37 for mounting in the SCR system 28, particularly in the wall of the SCR conduit 30, upstream of the SCR catalyst arrangement 31. Inside the housing 37, a passageway 38 leads from a reductant inlet 39 to a nozzle 40 and injector or nozzle outlet 41. The reductant inlet 39 is in fluid communication with the pump 54 (see FIG. 2). A valve member 42 including, for example, a needle element 42A is located within the passageway 38. The valve member 42 is moveable by an actuator 43 between an open position and a closed position. The actuator 43 may be an electrically activated solenoid or the like. The actuator 43 is communicatively connected to the control unit 58 such that the control unit 58 controls the movement of the valve member 42 (the needle element 42A) between the open and closed positions. The closed position is illustrated in FIG. 3.

During operation of the engine system 10, the control unit 58 controls the injection of reductant fluid 33 in order to control the reduction of NOx by the SCR system 28. During injection, the reductant fluid 33 may be directed back onto the nozzle 40 after injection by eddy currents in exhaust gases passing through the SCR conduit 30. Additionally, after purge, when the reductant injector 32 is in the closed position, reductant fluid 33 may remain in or enter the reductant injector 32, crystallize and form deposits inside the reductant injector 32. The crystallized deposits may then result in sticking of the valve member 42 (the needle element 42A). Accordingly, when the control unit 58 controls the actuator 43 to actuate the valve member 42, movement of the valve member 42 may be inhibited or blocked. As a consequence, the supply of reductant may be limited or blocked. This may result in the conversion efficiency of the SCR system 28 being severely reduced and may even lead to failure of the SCR system 28.

During operation of the engine system 10, each start of the SCR system 28 triggers one priming operation, and each shutdown of the SCR system 28 triggers one purging operation.

As used herein, the term "priming operation" refers to an operation mode of the SCR injection system 50 in which the SCR injection system 50 is made ready for operation. The priming operation includes activating the pump 54 to pump reductant from the reductant tank 52 to the reductant injector 32. The priming operation further includes actuating the reductant injector 32 to move into the open position.

As used herein, the term "purging operation" refers to an operation mode of the SCR injection system 50 in which the SCR injection system 50 is cleaned from remaining reductant in the SCR injection system 50. The purging operation includes activating and operating the pump 54 to pump remaining reductant from the reductant injector 32 back to the reductant tank 52. The purging operation further includes actuating the reductant injector 32 to move into the open position. An end of the purging operation is indicated by a negative pressure building up in the SCR injection system 50, particularly between the pump 54 and the reductant injector 32, because no fluid is left in the reductant injector 32 and the reductant supply line 60.

Figure 4:
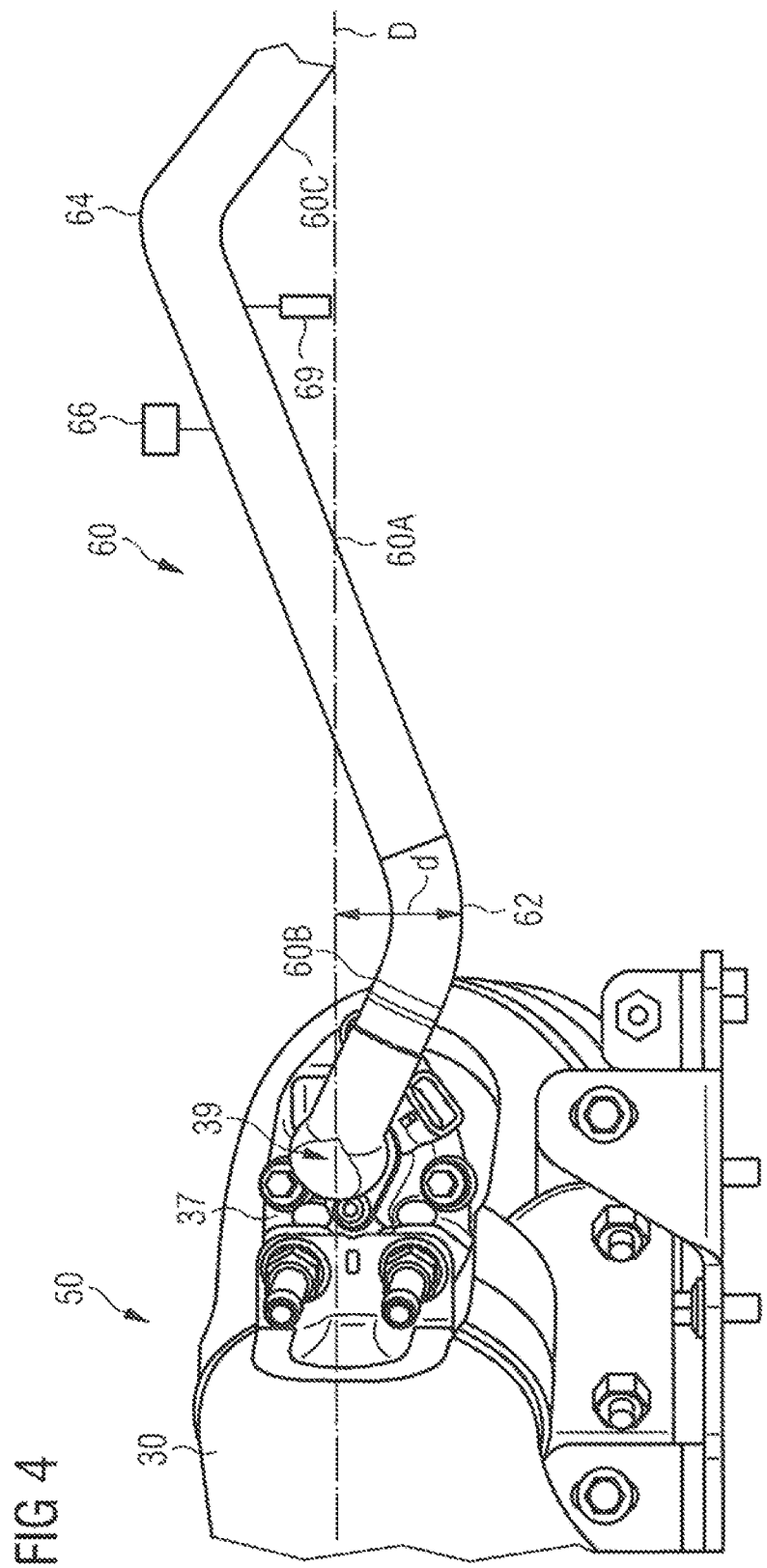
FIG. 4 illustrates an SCR injection system in accordance with an embodiment of the present disclosure.

Referring to FIG. 4, an SCR injection system 50 in accordance with an embodiment of the present disclosure is shown.

As shown in FIG. 4, the housing 37 of the reductant injector 32 is mounted to the conduit 30 of the SCR system 28. In particular, it will be readily appreciated by the skilled person that the reductant injector 32 is mounted such that it extends into the conduit 30 in order to inject reductant fluid into the same in accordance with the control by the control unit 58.

The reductant supply line 60 is connected to the reductant inlet 39 of the reductant injector 32 and connects the same to the pump 54, as described above. In particular, the reductant supply line 60 includes a portion 60C having an upward slope and extending from the pump 54 (not shown in FIG. 4) to a first bent portion 64. From the first bent portion 64, a first supply line portion 60A having a downward slope extends towards the reductant injector 32. In the embodiment shown in FIG. 4, the supply line portion having the downward slope extends to a second bent portion 62. From the second bent portion 62, a further supply line portion 60B extends upwards to the reductant inlet 39 of the reductant injector 32.

As shown in FIG. 4, the first bent portion 64 is disposed above a horizontal datum line D that passes through the reductant inlet 39 of the reductant injector 32. Likewise, the second bent portion 62 is disposed below the datum line D. In other words, the first bent portion 64 is disposed above the reductant inlet 39 of the reductant injector 32 in the vertical direction, whereas the second bent portion 62 is disposed below the reductant inlet 39 of the reductant injector 32 in the vertical direction. With this configuration, when the SCR injection system 50 is primed, i.e., when the pump 54 begins supplying pressurized reductant fluid 33 to the reductant supply line 60, the air in the reductant supply line 60 is compressed and pushed towards the reductant injector 32. The length of the individual portions of the reductant supply line 60 are configured such that the volume of the compressed air is smaller than the total volume of the reductant supply line 60 between the first bent portion 64 and the reductant inlet 39 of the reductant injector 32. In this manner, it can be assured that the pressurized fluid supplied by the pump 54 reaches the bent portion 64. When the pressurized fluid reaches the bent portion 64, gravity ensures that at least some reductant will flow towards the reductant inlet 39 and into the reductant injector 32 while the corresponding amount of compressed air is pushed out. In some embodiments, a ratio of the length of the reductant supply line 60 between the first bent portion 64 and the reductant inlet 39 to a total length of the reductant supply line 60 is between around 0.05 and around 0.3, preferably between around 0.1 and around 0.2. For example, if the system is pressurized to ten times atmospheric pressure, the ratio will be at least 0.1. It will be readily appreciated that any appropriate ratio can be selected based on the system pressure in order to assure that the reductant fluid 33 reaches the first bent portion 64.

It will also be appreciated that, in order to facilitate a flow of the reductant fluid 33 to the reductant inlet 39 while pushing out air, at least part of the second bent portion 62 should be disposed above the datum line D. In other words, although in FIG. 4 the dimensions have been exaggerated for the sake of illustration, the system is configured such that a distance d from the datum line D to the lowermost portion of the second bent portion 62 is less than the diameter of the reductant supply line 60 at the bent portion 62. Here, the datum line D may be defined by the lower edge of the reductant inlet 39.

In the exemplary embodiment shown in FIG. 4, the SCR injection system 50 further includes an air release valve 66 arranged in the reductant supply line 60 downstream of the first bent portion 64. In particular, the air release valve 66 may be arranged in the portion having the downward slope extending from the first bent portion 64 towards the second bent portion 62. In other embodiments, the air release valve 66 may be arranged in the portion extending from the second bent portion 62 towards the reductant inlet 39 or on the reductant injector 32, if desired. The control unit 58 may be configured to open the air release valve 66 at a predetermined time associated with a priming operation of the SCR injection system 50. For example, the control unit 58 may be configured to open the air release valve 66 prior to or upon initiating the supply of pressurized reductant fluid 33 to reductant supply line 60. It will be readily appreciated that opening of the air release valve 66 allows the air in the reductant supply line 60 to escape from the system, thereby resulting in suppression of the formation of the pocket of compressed air. Accordingly, as will also be readily appreciated, due to the provision of the air release valve 66, the length of the supply line portion 60A may be shortened. This may facilitate the installation of the system in case there is only limited space available in the engine system 10. Of course, the control unit 58 is further configured to close the air release valve 66 prior to the reductant fluid reaching the same in order to avoid leakage of the reductant fluid via the air release valve 66. To this end, the control unit 58 may be configured to close the air release valve 66 after lapse of a predetermined time interval, for example, from initiating the priming operation. It will be readily appreciated that the predetermined time interval can be determined, for example, by experiment, based on the length of the reductant supply line 60 from the pump 54 to the air release valve 66, the pressure in the system, etc. In some embodiments, a fluid sensor 69 may be provided in the reductant supply line 60 upstream of the air release valve 66. The fluid sensor 69 may be configured to detect a presence of reductant fluid in the reductant supply line 60. The control unit 58 may be operatively connected to the fluid sensor 69, and, upon receiving a corresponding detection result from the fluid sensor 69, close the air release valve 66 before reductant fluid reaches the same. It should be noted that, in other embodiments, the air release valve 66 and/or the fluid sensor 69 may be omitted.

With the configuration shown in FIG. 4, it can be assured that any reductant fluid that may flow back into the reductant injector 32 during a purge operation accumulates in the second bent portion 62, to thereby prevent the reductant fluid from entering the reductant injector 32 in order to avoid, for example, freeze damage. It will be appreciated, however, that in other embodiments, for example, in applications where it is less problematic that some reductant fluid may enter the reductant injector 32 during the purge operation, the second bent portion 62 may be omitted. In other words, the reductant supply line 60 may only include the first bent portion 64, such that the reductant supply line 60 immediately extends upwards from the reductant inlet 39 of the reductant injector 32 towards the first bent portion 64. The remaining configuration may be identical to the configuration shown in FIG. 4, i.e., the air release valve 66 and the fluid sensor 69 may be provided, if desired. Likewise, the above-mentioned ratios of the respective lengths of the supply line portions also apply.

In the above, it has been described that the problem of getting reductant fluid to the reductant injector 32 in order to dissolve any crystals formed therein is solved by providing an appropriate routing of the reductant supply line 60. However, in the following, other possibilities for avoiding this problem will be described.

In another exemplary embodiment, the reductant supply line 60 may be arranged such that it extends from the pump 54 towards the reductant inlet 39 of the reductant injector 32 without a portion having a downward slope. It will be readily appreciated that this assures that, during a purge operation, no reductant fluid will flow back towards the reductant injector 32. In this case, however, in order to allow the reductant fluid to reach the reductant inlet 39 during priming of the SCR injection system 50, it is necessary to provide the above-mentioned air release valve 66 either at the reductant inlet 39 or in or on the reductant injector 32. In this case, the control unit 58 may implement the above-described control of the air release valve 66 in order to assure that pressurized reductant fluid can reach the reductant inlet 39, and to close the air release valve 66 at the appropriate timing in order to assure that no reductant fluid leaks via the air release valve 66. It will be readily appreciated that, for example, the fluid sensor 69 may be provided, or that the appropriate timing may be determined in advance based on the system configuration and the system pressure.

Figure 5:
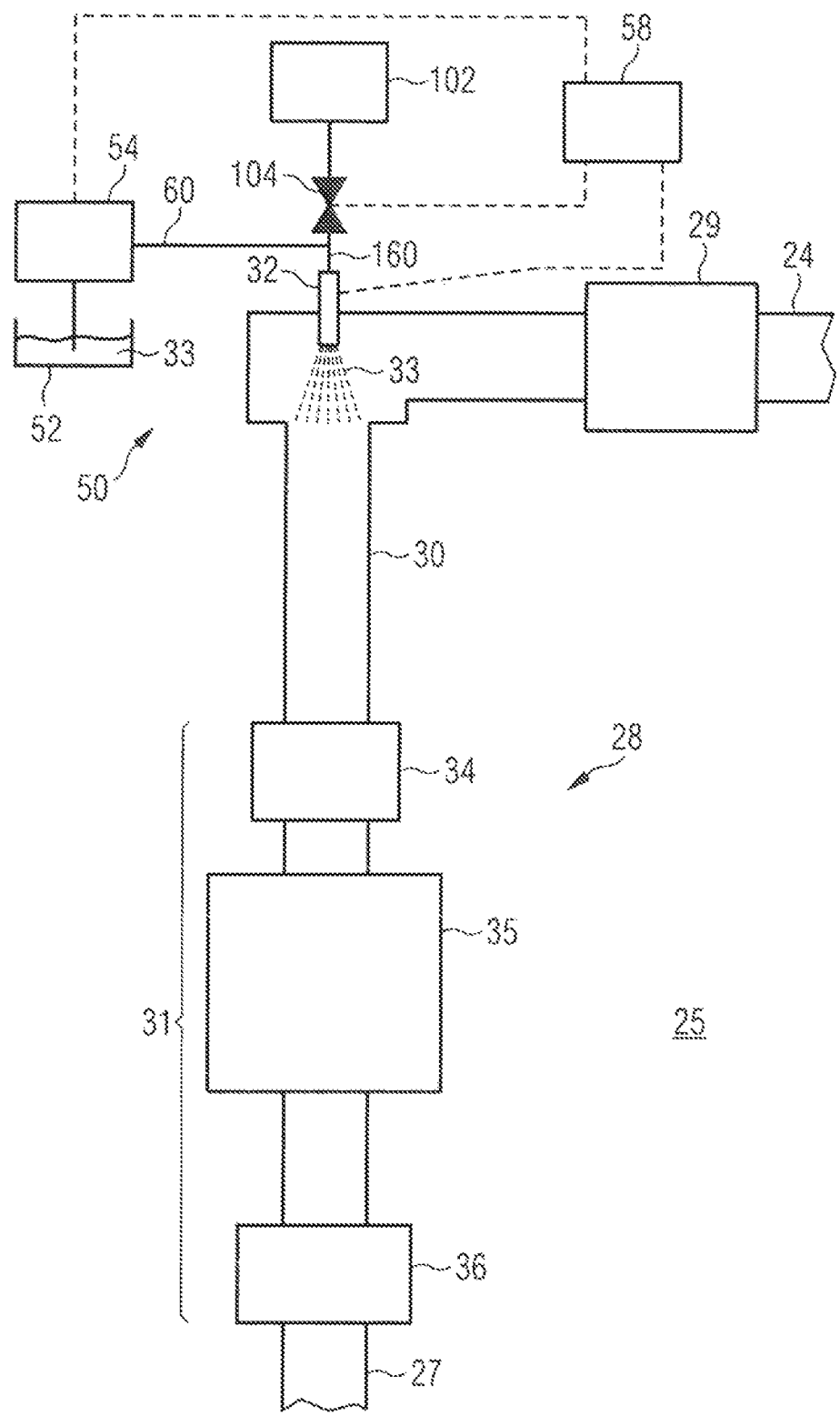
FIG. 5 is a schematic view of an exhaust aftertreatment module including an SCR injection system in accordance with another embodiment of the present disclosure.

In another modification that is shown in FIG. 5, a reductant reservoir 102 may be provided in order to supply reductant fluid to the reductant injector 32 in addition to the reductant fluid supplied via main reductant supply line 60 by the pump 54. As shown in FIG. 5, the reductant reservoir 102 is disposed above the reductant injector 32 and connected to the same by a further reductant supply line 160 that extends upwards from the reductant injector 32. Although this is not shown in detail in FIG. 5, it will be appreciated that, in order to allow a flow of reductant fluid from the reductant reservoir 102 to the reductant injector 32, the reductant reservoir 102 is disposed above the datum line D that is shown in FIG. 4. Accordingly, the reductant supply line 160 is also disposed above the datum line D, i.e., above the reductant injector 32. Of course, the reductant reservoir 102 does not need to be directly above the reductant injector 32, i.e., it may be offset with respect to the same in the horizontal direction, with an appropriate routing of the reductant supply line 160.

A supply valve 104 is disposed in the reductant supply line 160 and operatively connected to the control unit 58. The control unit 58 is configured to open the supply valve 104, in particular, prior to initiating a priming operation of the SCR injection system 50, i.e., prior to initiating a supply of pressurized reductant fluid 33 by the pump 54. In this manner, when the supply valve 104 is opened, reductant fluid 33 in the reductant reservoir 102 will flow towards and into the reductant injector 32 due to gravity. In this manner, any crystallized deposits inside the reductant injector 32 can be dissolved. In some embodiments, the control unit 58 may be configured to open the supply valve 104 for a predetermined time interval, in order to assure that any crystals present inside the reductant injector 32 can be reliably dissolved. It will readily appreciated that the time interval can be determined based on, for example, experiments and the like. In addition, when the priming operation is initiated, the control unit 58 may close the supply valve 104 in order to prevent compressed air from entering the reductant reservoir 102. It will readily be appreciated that an appropriate supply of reductant fluid to the reductant reservoir 102 may be assured in many different ways. For example, the reductant reservoir 102 may be fluidly connected to the reductant tank 52, for example, also via the pump 54, and the control unit 58 may be configured to actuate the pump 54 to supply pressurized reductant fluid to reductant reservoir 102 at an appropriate timing, for example, during priming of the system while the supply valve 104 is opened. Of course, the reductant reservoir 102 may also be fluidly connected to the reductant tank 52 in another manner, for example, by an additional pump or the like.

INDUSTRIAL APPLICABILITY

The method according to the present disclosure may ensure that crystallized deposits formed in the reductant injector 32 during periods in which reductant fluid 33 is not injected into the SCR system 28 may be reliably dissolved by supplying reductant fluid to the injector.

In one embodiment, the method generally includes a step of supplying a flow of pressurized reductant fluid to a reductant supply line 60. The method further comprises directing a flow of reductant fluid upwards to a first bent portion 64 of the reductant supply line 60, and then directing the flow of pressurized reductant fluid downwards from the first bent portion 64 to the reductant injector 32. In this manner, it can be assured that any reductant fluid that has reached the bent portion 64 can flow towards the reductant injector 32 due to gravity.

In order to prevent reductant fluid from entering the reductant injector 32 during a purge operation, the method may further include directing the flow of pressurized reductant fluid upwards to the reductant injector 32 from a second bent portion 62 arranged between the reductant inlet 39 of the reductant injector 32 and the first bent portion 64.

As an alternative or in addition, the methods disclosed herein may include a step of opening an air release valve in order to release air from the reductant supply line 60 during priming of the SCR injection system 50. The methods may further comprise a step of closing the air release valve 66 prior to any reductant fluid reaching the same. In this manner, it can also be reliably ensured that reductant fluid reaches the reductant inlet 39 without being blocked by a pocket of compressed air inside reductant supply line 60.

In other embodiments, the methods disclosed herein may comprise the step of providing a reductant reservoir 102 that is disposed above the reductant inlet 39 in the vertical direction. The method may include opening of a supply valve 104 disposed in a reductant supply line 160 extending from the reductant injector 32 to the reductant reservoir 102 in order to allow reductant fluid to flow into reductant injector 32 due to gravity. In particular, the method may include a step of opening the supply valve 104 prior to priming the SCR injection system 50, and closing the same after lapse of a predetermined time interval that is sufficient to ensure that any crystallized deposits inside the reductant injector 32 can be dissolved.

Although the preferred embodiments of this invention have been described herein, improvements and modifications may be incorporated without departing from the scope of the following claims.

What is claimed is:

1. A Selective Catalytic Reduction (SCR) injection system for an internal combustion engine, the SCR injection system comprising
a reductant injector having a housing;
a reductant inlet formed in the housing; and
a reductant supply line fluidly connected to the reductant inlet and configured to supply reductant to the reductant injector,
wherein the reductant supply line includes a downwardly inclined portion extending toward the reductant injector, the downwardly inclined portion being disposed at least in part above the reductant inlet of the reductant injector with respect to a horizontal datum line passing through the reductant inlet,
wherein the reductant supply line includes a first bent portion disposed above the reductant inlet with respect to the horizontal datum line, and
wherein a ratio of a length of the reductant supply line between the first bent portion and the reductant inlet to a total length of the reductant supply line is between 0.05 and 0.3.

2. The SCR injection system of claim 1, further comprising:
a reductant tank; and
a pump fluidly connected to the reductant inlet of the reductant injector by the reductant supply line, the pump being configured to supply pressurized reductant fluid from the reductant tank to the reductant inlet via the reductant supply line.

3. The SCR injection system of claim 2, wherein the downwardly inclined portion is a first supply line portion extending downward relative to the horizontal datum line from the first bent portion toward the reductant inlet, and
   wherein a second supply line portion extends downward relative to the horizontal datum line from the first bent portion toward the pump.

4. The SCR injection system of claim 3, wherein the reductant supply line further includes a second bent portion disposed at least in part below the reductant inlet with respect to the horizontal datum line, the second bent portion being arranged between the first supply line portion and a third supply line portion extending from the second bent portion to the reductant inlet.

5. The SCR injection system of claim 4, wherein a diameter of the reductant supply line at the second bent portion is greater than a distance between the horizontal datum line and a lowermost part of the second bent portion.

6. The SCR injection system of claim 1, wherein the ratio of the length of the reductant supply line between the first bent portion and the reductant inlet to the total length of the reductant supply line is between 0.1 and 0.2.

7. The SCR injection system of claim 3, further comprising an air release valve arranged in the reductant supply line downstream of the first bent portion and configured to be actuated to allow air in the reductant supply line to escape from the reductant supply line via the air release valve.

8. The SCR injection system of claim 7, further comprising a control unit configured to open the air release valve at a predetermined timing associated with a priming operation of the SCR injection system.

9. The SCR injection system of claim 8, wherein the control unit is further configured to close the air release valve after lapse of a predetermined time interval from initiating the priming operation.

10. The SCR injection system of claim 8, further comprising at least one of:
   a pressure sensor configured to measure a pressure in the SCR injection system; and
   a fluid sensor configured to detect a presence of reductant fluid in a portion of the reductant supply line,
   wherein the control unit is further configured to close the air release valve based on at least one of a measurement by the pressure sensor and a detection by the fluid sensor.

11. The SCR injection system of claim 1, further comprising:
   a reductant reservoir disposed above the reductant inlet with respect to the horizontal datum line, the reductant reservoir being fluidly connected to the reductant inlet by the reductant supply line; and
   a supply valve disposed in the reductant supply line and configured to be actuated to selectively allow or block a flow of reductant fluid from the reductant reservoir to the reductant inlet.

12. The SCR injection system of claim 11, further comprising a control unit configured to actuate the supply valve prior to initiating a priming operation of the SCR injection system.

13. The SCR injection system of claim 12, wherein the control unit is further configured to close the supply valve after lapse of a predetermine time interval, or based on a measurement by at least one of a pressure sensor configured to measure a pressure in the SCR injection system and a fluid sensor configured to detect a presence of reductant fluid in a portion of a main reductant supply line of the SCR injection system.

14. An engine system comprising:
   an internal combustion engine; and
   a Selective Catalytic Reduction (SCR) injection system for the internal combustion engine, the SCR injection system comprising
      a reductant injector having a housing;
      a reductant inlet formed in the housing; and
      a reductant supply line fluidly connected to the reductant inlet and configured to supply reductant to the reductant injector,
   wherein the reductant supply line includes a downwardly inclined portion extending toward the reductant injector, the downwardly inclined portion being disposed at least in part above the reductant inlet of the reductant injector with respect to a horizontal datum line passing through the reductant inlet,
   wherein the downwardly inclined portion is a first supply line portion extending downward relative to the horizontal datum line from the first bent portion toward the reductant inlet,
   wherein the reductant supply line includes a first bent portion and a second bent portion,
      the first bent portion being disposed above the reductant inlet with respect to the horizontal datum line,
      the second bent portion being disposed at least in part below the reductant inlet with respect to the horizontal datum line,
      the second bent portion being arranged between the first supply line portion and a second supply line portion extending from the second bent portion to the reductant inlet, and
   wherein a diameter of the reductant supply line at the second bent portion is greater than a distance between the horizontal datum line and a lowermost part of the second bent portion.

15. A method for removing deposits from a reductant injector of a Selective Catalytic Reduction (SCR) injection system for an internal combustion engine, the SCR injection system including
   a reductant injector having a housing;
   a reductant inlet formed in the housing; and
   a reductant supply line fluidly connected to the reductant inlet and configured to supply reductant to the reductant injector,
   wherein the reductant supply line includes a downwardly inclined portion extending toward the reductant injector, the downwardly inclined portion being disposed at least in part above the reductant inlet of the reductant injector with respect to a horizontal datum line passing through the reductant inlet,
   wherein the reductant supply line includes a first bent portion disposed above the reductant inlet with respect to the horizontal datum line, and
   wherein a ratio of a length of the reductant supply line between the first bent portion and the reductant inlet to a total length of the reductant supply line is between 0.05 and 0.3,
the method comprising:
supplying a flow of pressurized reductant fluid to the reductant supply line;
directing the flow of pressurized reductant fluid upward relative to the horizontal datum line to the first bent portion of the reductant supply line; and
directing the flow of pressurized reductant fluid downward relative to the horizontal datum line from the first bent portion toward the reductant injector.

* * * * *